United States Patent
Gowda

(10) Patent No.: US 10,759,362 B2
(45) Date of Patent: Sep. 1, 2020

(54) HARNESS FOR ASSISTED DRIVING

(71) Applicant: Byton Limited, Hong Kong (HK)

(72) Inventor: Srini Gowda, Solihull (GB)

(73) Assignee: BYTON LIMITED, Hong Kong (HK)

( * ) Notice: Subject to any disclaimer, the term of this patent is extended or adjusted under 35 U.S.C. 154(b) by 80 days.

(21) Appl. No.: 15/863,686

(22) Filed: Jan. 5, 2018

(65) Prior Publication Data

US 2019/0210544 A1    Jul. 11, 2019

(51) Int. Cl.
| | |
|---|---|
| *B60R 16/023* | (2006.01) |
| *B62D 15/02* | (2006.01) |
| *B60R 16/02* | (2006.01) |
| *B60W 10/08* | (2006.01) |
| *B60W 10/18* | (2012.01) |
| *B60W 10/20* | (2006.01) |
| *B60W 30/06* | (2006.01) |
| *B60W 30/18* | (2012.01) |
| *B60W 50/14* | (2020.01) |
| *G08G 1/16* | (2006.01) |
| *G01S 15/931* | (2020.01) |
| *G01S 13/931* | (2020.01) |

(52) U.S. Cl.
CPC ...... *B60R 16/0231* (2013.01); *B60R 16/0207* (2013.01); *B60W 10/08* (2013.01); *B60W 10/18* (2013.01); *B60W 10/20* (2013.01); *B60W 30/06* (2013.01); *B60W 30/18009* (2013.01); *B60W 50/14* (2013.01); *B62D 15/027* (2013.01); *G08G 1/168* (2013.01); *B60W 2050/146* (2013.01); *B60W 2420/52* (2013.01); *B60W 2540/215* (2020.02); *B60W 2710/08* (2013.01); *B60W 2710/18* (2013.01); *B60W 2710/20* (2013.01); *G01S 13/931* (2013.01); *G01S 15/931* (2013.01)

(58) Field of Classification Search
None
See application file for complete search history.

(56) References Cited

U.S. PATENT DOCUMENTS

| | | | |
|---|---|---|---|
| 9,135,219 | B2 | 9/2015 | Binder et al. |
| 2004/0011146 | A1 | 1/2004 | Ishihara et al. |
| 2006/0069484 | A1 | 3/2006 | Thomson et al. |
| 2009/0146846 | A1* | 6/2009 | Grossman ............... B60R 25/04 340/988 |

(Continued)

FOREIGN PATENT DOCUMENTS

WO    102011015509 A1    1/2012

OTHER PUBLICATIONS

PCT International Search Report and Written Opinion of the International Searching Authority for PCT/US2018/068197, dated Apr. 23, 2019, 15 pages.

*Primary Examiner* — Richard M Camby
(74) *Attorney, Agent, or Firm* — Womble Bond Dickinson (US) LLP

(57) ABSTRACT

A car includes a factory installed harness and a factory installed data processing component coupled to the factory installed harness. The factory installed harness is configured to receive an assisted driving hardware component in order to allow the assisted driving hardware component to make electrical connection with the data processing component when the assisted driving hardware component is installed by the car's owner or user or dealer. The assisted driving hardware component can be a user installed LIDAR to add to the car's assisted driving functionality.

21 Claims, 5 Drawing Sheets

(56) References Cited

U.S. PATENT DOCUMENTS

| | | |
|---|---|---|
| 2013/0289826 A1 | 10/2013 | Yoshitake et al. |
| 2014/0200769 A1 | 7/2014 | Noh |
| 2014/0306817 A1* | 10/2014 | Ricci .................. H04W 4/21 340/457 |
| 2016/0371977 A1 | 12/2016 | Wingate et al. |
| 2017/0124407 A1 | 5/2017 | Micks et al. |
| 2018/0334114 A1* | 11/2018 | Sugimoto ............ B60R 16/023 |
| 2019/0047414 A1* | 2/2019 | Zylstra ................. F02D 41/266 |

\* cited by examiner

HARNESS FOR ASSISTED DRIVING

BACKGROUND

Vehicles such as automobiles, trucks, motorcycles, and other motorized vehicles (referred to as "cars") are becoming more sophisticated as assisted driving features are included in the cars by car manufacturers as factory installed features. For example, car manufacturers such as Toyota, etc. are including assisted driving features such as lane departure warning and blind spot detection as factory installed features in cars. These features use factory installed sensors such as ultrasound sensors and radar sensors and cameras to provide the assisted driving features. One of the most advanced set of assisted driving features can provide what can be referred to as autonomous driving. Some car manufacturers have included factory installed autonomous driving features which allow the car to drive itself so that a user, such as a driver, does not need to control the steering or the accelerator or the brakes but may need to be ready to take control of the car upon request by the autonomous driving system. A car that includes an autonomous driving system as a factory installed feature can be referred to as a self driving car. Some cars that include a factory installed autonomous driving system can receive software updates which can be downloaded to the car to update the software in the car, such as software relating to or used by the autonomous driving system. The updating process updates the software to change the software, such as the correction of bugs or the addition of features or functionality, etc.

SUMMARY OF THE DESCRIPTION

The embodiments described herein relate to a car which includes a factory installed harness that is configured to receive an assisted driving hardware component to add to the assisted driving functionality of the car. The word car as used in this description means a motorized vehicle such as an automobile, truck, a motorcycle, or other motorized vehicles. In one embodiment the car can include the factory installed harness, a data processing component such as a data processing system that is coupled to the factory installed harness, and a set of one or more factory installed sensors which are coupled to the data processing component, where that set of factory installed sensors are configured to provide assisted driving functionality. The harness is configured to mechanically receive an assisted driving hardware component which is delivered to a user or driver who has bought or otherwise obtained the car. The harness is configured in one embodiment to make both a mechanical connection and an electrical connection between the assisted driving hardware component that is added to the car and the data processing component. The assisted driving hardware component which is added to the car (after the car has been delivered to the driver or user) can increase the assisted driving functionality to the point where the car now includes an autonomous driving system which allows the car to drive itself. In one embodiment, the car can further include a radio which is configured to receive downloaded software to set up and activate the assisted driving hardware component which was installed by the user or a dealer into the harness. In one embodiment, the radio can be coupled to the data processing component which is coupled to the assisting assisted driving hardware component through the factory installed harness. The factory installed harness can include a set of electrical contacts that are configured to make contact with electrical contacts on the assisted driving hardware component which can be inserted into the car by the user or driver or by a dealer on behalf of the user or driver.

In one embodiment, the car can include a set of one or more electric motors (or other types of engines) which are coupled to the data processing component, and a braking system which is coupled to a braking system controller that is also coupled to the data processing component, and a steering system coupled to the data processing component. Further, the car can also include a storage medium such as a flash memory or a magnetic hard drive, etc. The storage medium can store data for the assisted driving system which is controlled at least in part by the data processing component and can also store calibration data for sensors of the assisted driving system and can store software for the initialization and operation of the assisted driving system. The software which is stored on the storage medium can be the downloaded software received by a radio in the car. The downloaded software in one embodiment can be used to initialize the assisted driving hardware component when that component is set up or configured. In one embodiment, the set of factory installed sensors (which exist in the car before the assisted driving hardware component is added to the car) can be sensors that are configured to provide parking assistance to park the car. In one embodiment, the car can further include a redundant braking system controller which is coupled to the data processing component and which is configured to be controlled based upon data from the assisted driving hardware component which is coupled to the factory installed harness. The car can further include a redundant battery system coupled to the data processing component and to the assisted driving hardware component to provide a redundant power source for the data processing component and for the assisted driving hardware component that was added to the car by the user or dealer and was not a factory installed option.

In one embodiment, the set of one or more factory installed sensors can be one or more of cameras, ultrasound sensors, radar, both short and long radar, and even a light detection and ranging system (LIDAR). In one embodiment, the assisted driving hardware component which is added to the vehicle by the user or dealer can be a light detection and ranging system such as a LIDAR system.

In one embodiment, the car can also include a touchscreen display coupled to the data processing system. The touchscreen display can itself be an input device, and the touchscreen display can be configured to display a human machine interface to control the assisted driving hardware component or to monitor that component; in one embodiment, the human machine interface can be activated after installation of the assisted driving hardware component. In one embodiment, the assisted driving hardware component can change the level of assisted driving functionality of the car from a lower level of assisted driving functionality to a higher level of assisted driving functionality. For example, the addition of the assisted driving hardware component can change the assisted driving functionality of the car from a level III to a level IV of assisted driving functionality. In one embodiment the data processing component can include one or more processors for parking assist and one or more processors for high-speed processing during driving at highway speeds. In one embodiment, the data processing comp component can be configured to receive downloaded software for use in activating and operating the assisted driving hardware component, and the assisted driving hardware component can be activated and calibrated by the data processing component which activates and calibrates the assisted driving hardware component using the downloaded software. In one embodiment, an application programming interface (API) for the assisted driving hardware component can be activated and enabled for use by the assisted driving hardware component in the data processing component to allow the system the assisted driving hardware component to operate with the data processing component through the API.

The embodiments described herein also include methods for adding to the assisted driving functionality of a car. In one embodiment the method can include: receiving, by the car having a factory installed harness, an assisted driving hardware component which includes an electrical connection interface configured to electrically couple to the factory installed harness; and setting up, by a data processing component in the car, the assisted driving hardware component to operate with the data processing component to add assisted driving functionality to the car. In one embodiment, the car receives the assisted driving hardware component when a user or driver installs the assisted driving hardware component after having received the car from the factory where the car was manufactured. In one embodiment, the dealer may install the assisted driving hardware component into the factory installed harness after the car has been delivered to the user or driver. In one embodiment, the car includes as factory installed components the data processing component and can also include a set of one or more factory installed sensors that are coupled to the factory installed data processing component to provide a first level of assisted driving functionality which is improved by the addition of the assisted hardware driving component that is added to the car by the user or dealer.

In one embodiment, the assisted driving hardware component can be set up after downloading of software for use with the assisted driving hardware component. The downloading of the software can occur through or be initiated by a mobile application running on the user's mobile device, such as a smart phone, which stores a vehicle identification number of the car and a user identification data such as a user's email address. In one embodiment, the vehicle identification number of the car and the user identification data can be used to authenticate the user to the car and the smart phone to the car to allow the car to install the downloaded software and also to authenticate the assisted driving hardware component to the car.

In one embodiment, the downloading can be through one or more radios which can include a radio frequency transceiver in the user's mobile device or a radio frequency transceiver in the car. In one embodiment, the radio frequency transceiver in the mobile device, such as a smart phone is one of a WiFi transceiver or a cellular telephone transceiver. In one embodiment, the radio frequency transceiver in the car can be one of a Bluetooth transceiver, a Wi-Fi transceiver, or a cellular telephone transceiver. The authentication of the assisted driving hardware component can be based upon, in one embodiment, data from the car and data from the assisted hardware driving component. This authentication can be done to verify that the assisted driving hardware component is safe to use in the car and can be trusted and is capable of providing a desired level of functionality for assisted driving. In one embodiment, the process of downloading software for use in setting up the assisted driving hardware component can include an authentication process and can further include setting up the assisted driving hardware component by activating an application programming interface between software running for the assisted driving hardware component and software running on the data processing component. Further, setting up the assisted driving hardware component can also include calibrating one or more sensors in the assisted driving hardware component, wherein the calibration can be performed in part by the downloaded software. Setting up the assisted driving hardware component can also include activating a human machine interface (e.g., a Graphical User Interface on a touchscreen) in the car for the assisted hardware driving component.

In one embodiment, the data processing component is coupled to one or more motors that are configured to move the car and is coupled to one or more braking systems that are configured to slow or brake the car and is coupled to a steering system to steer the car. In one embodiment, the data processing component provides driving assistance by controlling the one or more motors and by controlling the one or more braking systems and by controlling the steering system based on data from the assisted driving hardware component after the one or more sensors in the assisted driving hardware component have been calibrated. In one embodiment, the addition of the assisted driving hardware component by the user or the dealer can add autonomous driving functionality to the car.

The methods and cars described herein can include non-transitory machine readable medium that store executable computer program instructions that can cause one or more data processing systems, such as a data processing component described herein, to perform the one or more methods described herein when the computer program instructions are executed.

The above summary does not include an exhaustive list of all embodiments in this disclosure. The cars and methods described herein can be practiced from all suitable combinations of the various aspects and embodiments summarized above and also those disclosed in the detailed description below.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present embodiments are illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
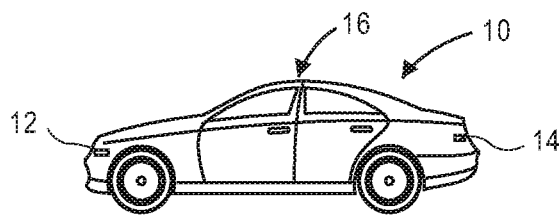
FIG. 1A (FIG. 1A) shows a see through side view of a car containing a set of harnesses configured to receive one or more assisted driving hardware components to be added by a user or dealer after the user or driver receives the car from a factory.
Figure 1B:
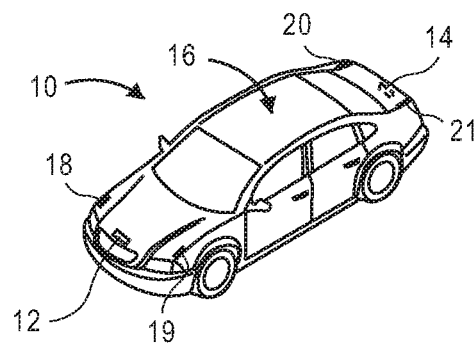
FIG. 1B (FIG. 1B) shows a see through top view of the car in FIG. 1B.

FIG. 1A shows a car in a side view in which at least a portion of the car is shown in a see through view manner that shows a front harness 12 and a back harness 14 in the car 10. The car includes a passenger compartment 16 in which passengers sit. One passenger can be the driver who can control the steering and acceleration and braking using conventional systems and methods known in the art. The car 10 can be a motorized vehicle which can be anyone of an automobile, a truck, a motorcycle, or other motorized vehicles, but in the case of FIGS. 1A and 1B, an automobile is shown with a standard passenger compartment 16 in the middle of the car. The passenger compartment 16 can include seats and other features which are typical for an automobile. In one embodiment, the car 10 can include a single harness, such as the front harness 12, while in an alternative embodiment, the car 10 can include more than one harness, such as a front harness 12 and a back harness 14. Each of these harnesses can be configured to receive an assisted driving hardware component, such as the assisted driving hardware component 60 or the assisted driving hardware component 155 shown in FIGS. 2 and 4 respectively. The assisted driving hardware component can be added by the driver or user or owner of the car after the car is purchased from a dealer and after the car has been manufactured by a car manufacturer. Thus, the assisted driving hardware component, such as the assisted driving hardware component 60 is not installed by the factory but rather it is installed by the owner or driver or user of the car after the car is delivered to the user or driver by a dealer. The harnesses, such as front harness 12 and back harness 14 can be factory installed harnesses that are designed to receive a hardware component to make both a mechanical connection and an electrical connection to the hardware component, such as the assisted driving hardware component 60 in FIG. 2 or the assisted driving hardware component 155 shown in FIG. 4. The factory installed harness, such as front harness 12 is coupled to a data processing component that can be configured to operate with a later developed assisted hardware driving component which can be inserted into the car by the owner or driver or user of the car. For example, the user or driver of the car can purchase the car in one year and then install the assisted driving hardware component into the harness in the following year to add to the functionality of the assisted driving system in the car 10. In one embodiment, the car 10 can include some assisted driving features prior to the installation of the assisted driving hardware component, such as the assisted driving hardware component 60 shown in FIG. 2 or the assisted driving hardware component 155 in FIG. 4. FIG. 1B shows, in a top view in which at least a portion of the car is shown in see through view manner, an example in which factory installed sensors for assisted driving exist in the car and provide some assisted driving functionality and features prior to the insertion of the assisted driving hardware component such as the assisted driving hardware component 60 shown in FIG. 2. In the example shown in FIG. 1B, the factory installed sensors for assisted driving can be the factory installed sensors 18, 19, 20, and 21. In one embodiment, these sensors may be parking assist sensors or lane departure sensors or cameras or other sensors that can provide factory installed assisted driving features prior to the addition of the assisted driving hardware component which can be added later through the factory installed harness, such as the factory installed harness 12. The one or more factory installed sensors can include cameras, ultrasound sensors, radar, and light detection and ranging systems which can employee pulsed lasers, such as LIDAR.

Figure 2:
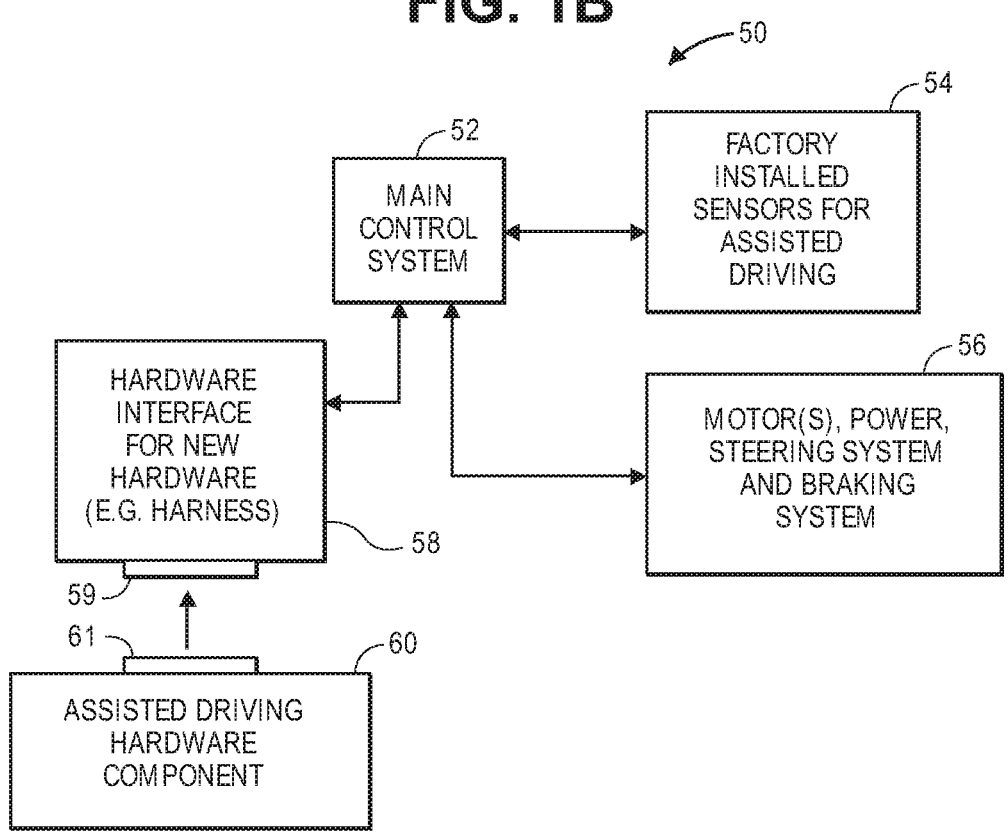
FIG. 2 (FIG. 2) shows an example in block diagram form of an embodiment which includes a factory installed harness that is configured to receive an assisted driving hardware component such as a LIDAR system added by the user after the user has received the car and has been driving the car for some time in one embodiment.
Figure 4:
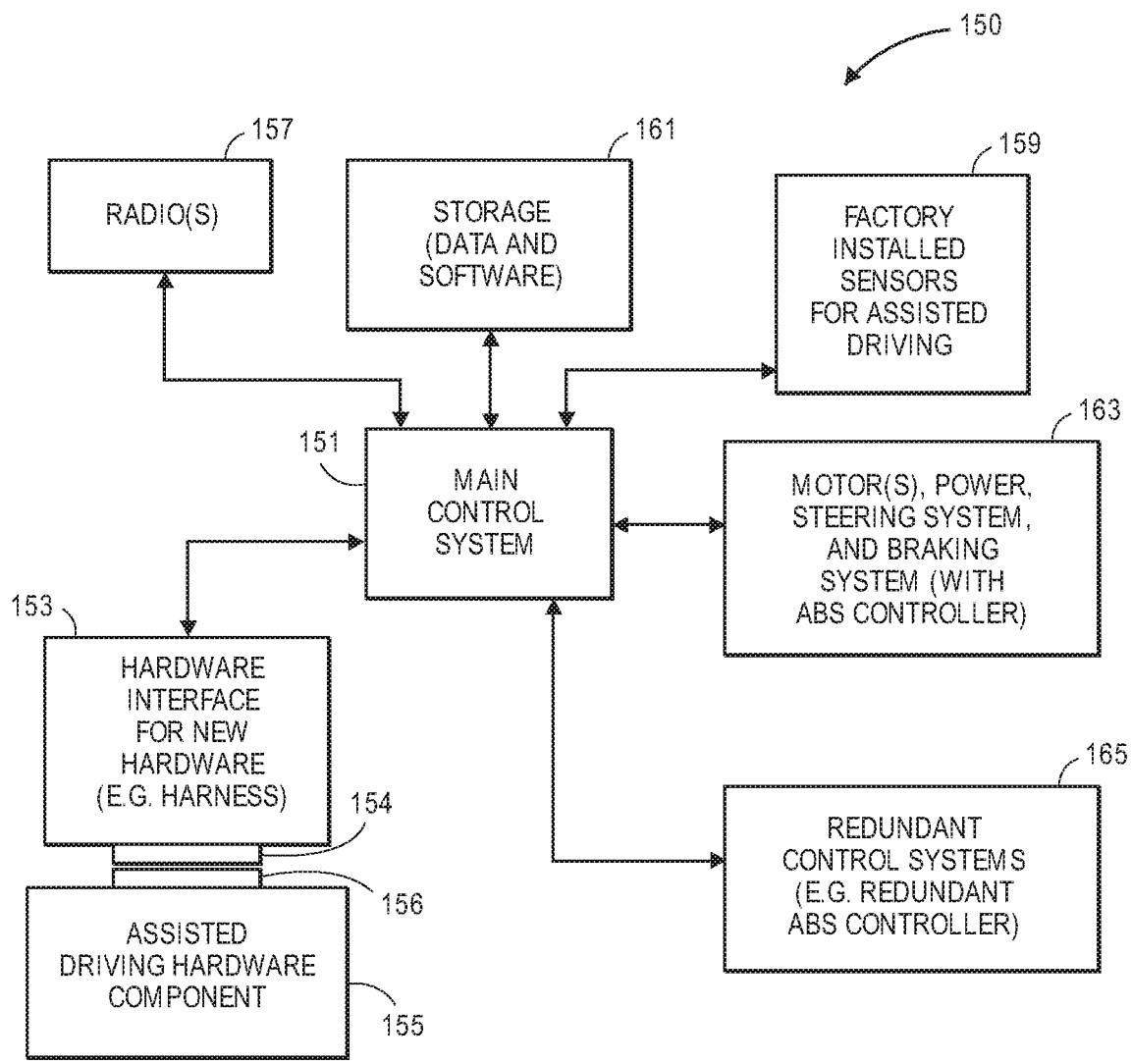
FIG. 4 (FIG. 4) is a block diagram that shows another embodiment which includes a factory installed harness configured to receive, after delivery to the owner of the manufactured the car, an assisted driving hardware component.

FIG. 2 shows an example of an assisted driving system which can be included as part of the car 10 which includes at least one harness, such as the front harness 12 in the car 10. The assisted driving system 50 shown in FIG. 2 can include a main control system 52 which can be considered to include one or more data processing components such as computers, etc. for operating the assisted driving system within the car, such as the car 10. The main control system 52 can be coupled to a set of factory installed sensors for assisted driving, such as the factory installed sensors 54 which can represent one or more of the factory installed sensors 18, 19, 20, and 21 in one embodiment. These factory installed sensors for assisted driving can include sensors for parking assist or sensors for lane departure, etc. The main control system 52 is also coupled to one or more motors, a power system, a steering system and a braking system 56 as shown in FIG. 2 to provide assisted driving assistance by controlling the one or more motors and the steering system and the braking system using techniques known in the art. The control of the motors and steering system and braking system 56 can be performed by the main control system 52 based upon sensor data from the factory installed sensors 54. The main control system 52 is also coupled to a hardware interface for new hardware. This hardware interface 58 can be a factory installed harness, such as the front harness 12 shown in FIGS. 1A and 1B and can include a mechanical connector designed to make a mechanical connection with an assisted driving hardware component such as the assisted driving hardware component 60 and can also include an electrical connector 59 configured to make an electrical connection with a corresponding electrical connector 61 on the assisted hardware driving component 60 when the driver or user or dealer inserts the assisted driving hardware component 60 into the hardware interface 58 which can represent the front harness 12 shown in the car 10 in FIG. 1A. In the example shown in FIG. 2, the assisted driving component 60 has not been inserted into the harness and hence has not made electrical connection between the assisted driving hardware component 60 and the hardware interface 58. When the user or dealer inserts the assisted driver driving hardware component 60 into the harness, such as the hardware interface 58, then in one embodiment electrical connection and mechanical connection is made as shown in FIG. 4 which shows the assisted hardware driving component 155 plugged into or inserted into a harness, such as the hardware interface 153. When the assisted driving hardware component 60 is inserted or plugged into the harness, such as the hardware interface 58, the main control system 52 can then set up the new hardware such as the assisted driving hardware component 60 so that it can work with the assisted driving set system 52 and thereby add to the assisted driving functionality or features of the car 10. In one embodiment, the assisted driving hardware component 60 can be a light detecting and ranging system such as a LIDAR system that can convert the car from a level III assisted driving system to a level IV assisted driving system which includes autonomous driving functionality that can allow the car to drive by itself in one embodiment. Thus, in the example shown in FIG. 2, the car can initially provide limited assisted driving features as delivered from the factory to a user or dealer and then after the user or driver takes delivery of the car, sometime later (such as a year later) the user or driver can install or insert an assisted driving hardware component into the factory installed harness, such as the front harness 12 to convert the car into an autonomous driving car.

Figure 3:
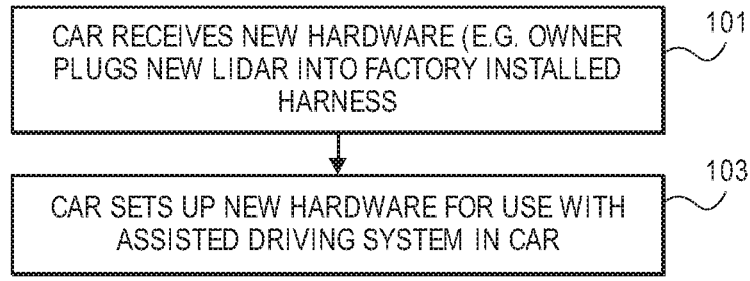
FIG. 3 (FIG. 3) shows an example of a simplified flowchart showing a method according to one embodiment described herein.

FIG. 3 shows an example of a method which can be used with the assisted driving system 50 shown in FIG. 2 or the assisted driving system 150 shown in FIG. 4. The method shown in FIG. 3 can begin sometime after the user or driver takes ownership or otherwise obtains the car. In operation 101 the car receives new hardware which can be the assisted driving component 60 shown in FIG. 2 or the assisted driving hardware component 155 shown in FIG. 4. The receipt by the car can occur when the owner or driver of the car plugs a new LIDAR or other assisted driving hardware component into the factory installed harness, such as the factory installed front harness 12 shown in FIG. 1A. In an alternative embodiment, the owner or driver of the car can request the dealer or other service facility to plug or insert the assisted driving hardware component into the factory installed harness. Then in operation 103, the car can set up the new hardware, such as the new LIDAR which was plugged into the factory installed harness so that the new hardware can be used with the assisted driving system in the car. The set up performed in operation 103 can include a number of different operations which can include activation of an API for the new hardware as well as calibration of sensors in the new hardware and the activation of a human machine interface for control or monitoring of the new hardware, and such operations are described further below in conjunction with FIG. 6.

FIG. 4 shows an example of an assisted driving system 150 which includes additional components not shown in the assisted driving system 50 of FIG. 2. The main control system 151 can be similar to the main control system 52 and can include one or more processors or processing systems configured to process certain types of sensor data, such as sensor data for parking assist and can also include one or more other processors or processing systems for processing sensor data from sensors configured to operate during driving at normal speeds such as highway speeds. The main control system 150 can include one or more buses coupled to one or more processors as well as memory, such as DRAM memory. In addition, the main control system 150 can utilize data and software stored in storage 166 which can be in one embodiment flash memory or magnetic hard drive or other storage media known in the art for storing data and software for use by the main control system 151. The factory installed sensors 159 can be factory installed sensors for assisted driving such as parking assist or lane departure warnings, etc. These factory installed sensors 159 can be similar to the factory installed sensors 54 shown in FIG. 2. The assisted driving system 150 can also include one or more radios 157 which can be radio frequency transceivers that are configured to receive data and software such as downloaded software for storage in the storage 161 after the software is downloaded. In one embodiment, the process of setting up the new hardware such as the assisted driving hardware component 60 or the assisted driving hardware component 155 can include downloading software for the new hardware, which software can include executable code for interfacing with the new hardware such as a driver software for the new hardware which can be stored in storage 161 and used to activate the new hardware as well as to activate an API for the new hardware and calibrate the new hardware in one embodiment. The one or more radios 157 can include a Wi-Fi transceiver or a cellular telephone transceiver or a Bluetooth transceiver or other radio frequency transceivers that are known in the art. In one embodiment, the downloading of the software can be performed directly by radios within the car and this downloading may be initiated through a user interface on the car or another device such as the owner's smartphone; in another embodiment, the downloading of the software can be performed through the use of a smartphone or other device operated by the owner or driver of the car which acts as an intermediary to cause the downloading of the software first to the smart phone and then to the car through the smart phone of the user or owner. In one embodiment, the smart phone can include a mobile app configured by the user or owner of the car to include the vehicle identification number of the car and a user identification such as a user's email address which can be used together to authenticate the smart phone to the car and vice versa to allow the mobile app on the smart phone to initiate the download and cause the car to set up the assisted driving hardware component. Once the downloaded software is stored in storage 161 it can be used by the main control system 151 to activate and set up the new hardware such as the assisted driving hardware component 155 which can be similar to the assisted driving hardware component 60 shown in FIG. 2. In the example shown in FIG. 4, the assisted driving hardware component has been plugged into the hardware interface 153 which can be the same as the front harness 12 in the car 10 shown in FIG. 1A. The assisted driving hardware component 155 makes an electrical connection with the hardware interface 153 through the electrical connector 154 on the hardware interface 153 and the electrical connector 156 on the assisted driving hardware component 155.

The assisted driving system 150 can also include redundant control systems 165 which can be, for example, a redundant anti-lock braking system (ABS) controller for controlling the antilock braking system of the car which includes a main antilock braking system which is in addition to the redundant control system that includes the redundant ABS controller. In one embodiment, sensor data from the assisted driving hardware component 155 can be used to control the redundant control systems 165 through algorithms implemented by the main control system 151.

Figure 6:
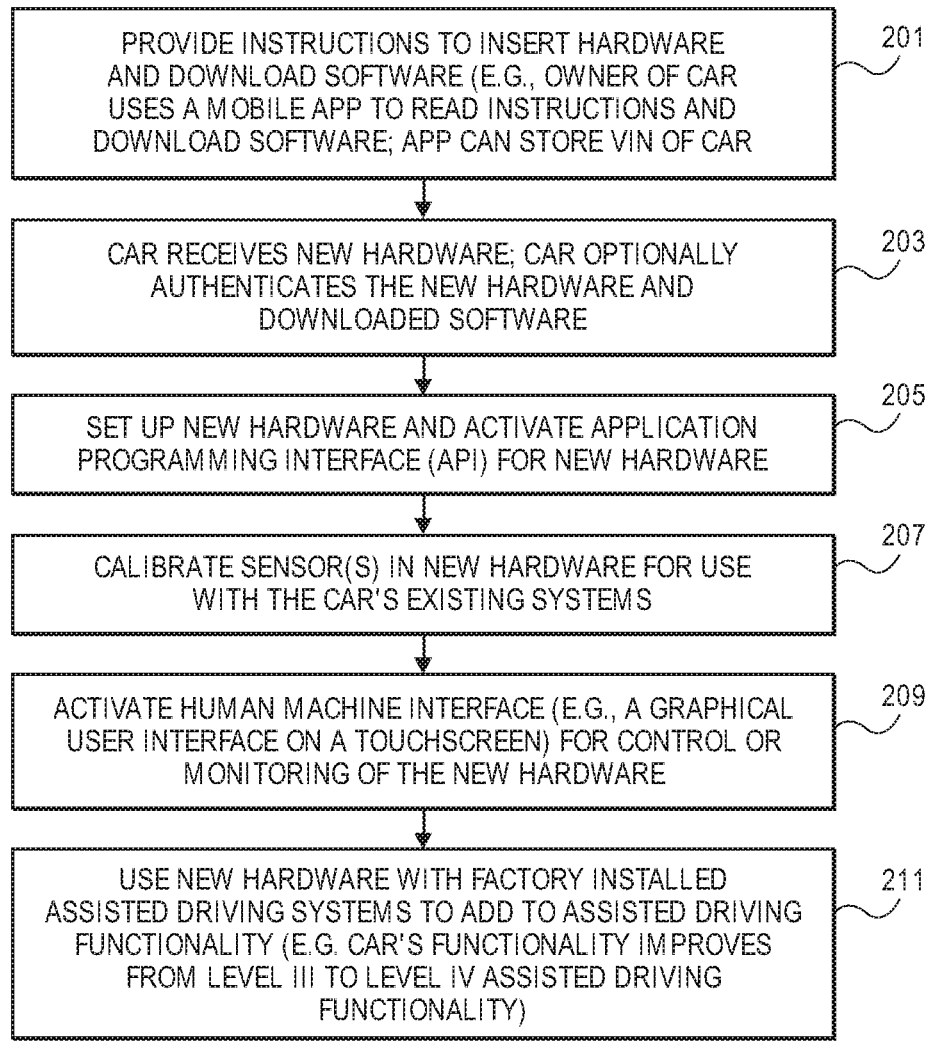
FIG. 6 (FIG. 6) is a flowchart which illustrates a method according to another embodiment described herein.

FIG. 6 shows an example of a method which can be performed with the assisted driving system 50 shown in FIG. 2 or the assisted driving system 150 shown in FIG. 4. In operation 201, instructions can be provided to the user or owner or dealer to insert the new hardware into the factory installed harness, such as the factory installed front harness 12, and instructions to download software can also be provided. In one embodiment, the owner of the car can use a mobile application on the owner's smart phone or other device to read the instructions and to then cause the downloading of the software for configuring and operating the new hardware such as the assisted driving hardware component 155 or the assisted driving hardware component 60. The mobile app can store the vehicle identification number of the car and also store user identification such as the owner's email address. In one embodiment, the vehicle identification number and the owner's user identification can be linked together through a hash function or other technique known in the art which can be used in subsequent processing, such as in the authentication of the new hardware and in the authentication of the owner's smart phone to the car. In operation 203, the car can receive the new hardware when the owner or a dealer installs or plugs in the new hardware such as the assisted driving hardware component 155 shown in FIG. 4 or the assisted driving hardware component 60 shown in FIG. 2. Also in operation 203, the car can authenticate the new hardware by using data in the car and data in the new hardware to verify that the hardware will work with the car and is a proper new hardware device that can be trusted. In one embodiment, the authentication can occur through the mobile app which can provide information about the car to the car so that the car can authenticate the mobile app and the owner relative to the new hardware to permit it to be used with the car. Operation 203 can also include downloading software for use with the new hardware, such as driver software and other software configured to be used with the new hardware. In one embodiment, the downloaded software can be driver software for the new hardware which can run on the main control system or some data processing system within the car to allow the car to interact with the new hardware. In operation 205, a processing system, such as a processing system within the main control system 151 of FIG. 4 or the main control system 52 in FIG. 2 can set up the new hardware and activate an application programming interface (API) for the new hardware. In one embodiment, this API exists in the car as an interface between the assisted driving hardware component 155 or the assisted driving hardware component 60 and the car. In one embodiment, this API can be used as an interface between the driver software which can run on a data processing component within the main control system 151 or the main control system 52 and other software also running on that data processing component, such as software which is configured to perform assisted driving functionality which can control the motors, the steering, and the braking systems of the car in one embodiment. After the hardware has been set up and the API has been activated, in one embodiment, operation 207 can then be performed in which the sensors in the new hardware, such as the assisted driving hardware component 155 or the assisted driving hardware component 60 are calibrated for use with the car's existing assisted driving systems, such as the assisted driving system 150. This calibration can be done by the downloaded software which was downloaded in operation 203 and which can be the driver software for the new hardware such as the assisted hardware driving components 155 or 60. Then in operation 209, a human machine interface can then be activated for control or monitoring of the new hardware. For example, a graphical user interface on a touchscreen can be activated so that the owner or dealer control can control or monitor the new hardware such as the assisted driving hardware components 155 or 60. Then in operation 211 the new hardware can be used with the factory installed assisted driving systems to add to the assisted driving functionality of the car. For example, the new hardware can improve the car's assisted driving functionality by improving the level of functionality from a level III to a level IV of assisted driving functionality which can include autonomous driving allowing the car to drive itself without the user having to control the steering or the acceleration or the braking of the car.

Figure 5:
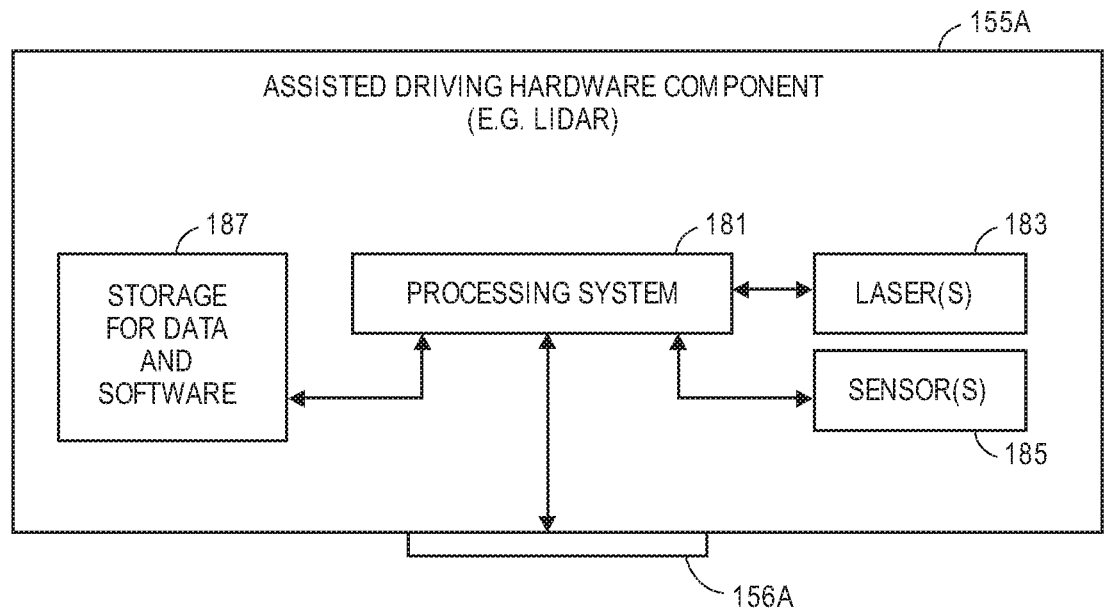
FIG. 5 (FIG. 5) shows an example, in block diagram form, of an assisted driving hardware component, such as an LIDAR system.

FIG. 5 shows an example of an assisted driving hardware component which can be the same as the assisted driving hardware components 155 or 60. As shown in FIG. 5, the assisted driving hardware component 155A can be a LIDAR system which includes an electrical connector 156A which can be the same as the electrical connector 156 shown in FIG. 4 which is part of the assisted driving hardware component 155. The assisted driving hardware component 155A can include a processing system 181 which is coupled to one or more lasers 183 and which is also coupled to one or more sensors 185. The lasers 183 can be pulsed lasers that can provide in conjunction with the one or more sensors 185 a light detecting and ranging system controlled by the processing system 181. The processing system 181 can configure and control the one or more lasers 183 and can receive sensor data from the one or more sensors 185 and process that sensor data to derive a three-dimensional map of the environment of the car that can then be provided through the electrical connector 156A to a main control system, such as the main control system 151 in FIG. 4 or the main control system 52 in FIG. 2. The processing system 181 can operate under the control of software stored in storage 187 which can also store data, such as calibration data for the one or more sensors 185. The sensors 185 can be calibrated during operation 207 in FIG. 6 in one embodiment.

Figure 7A:
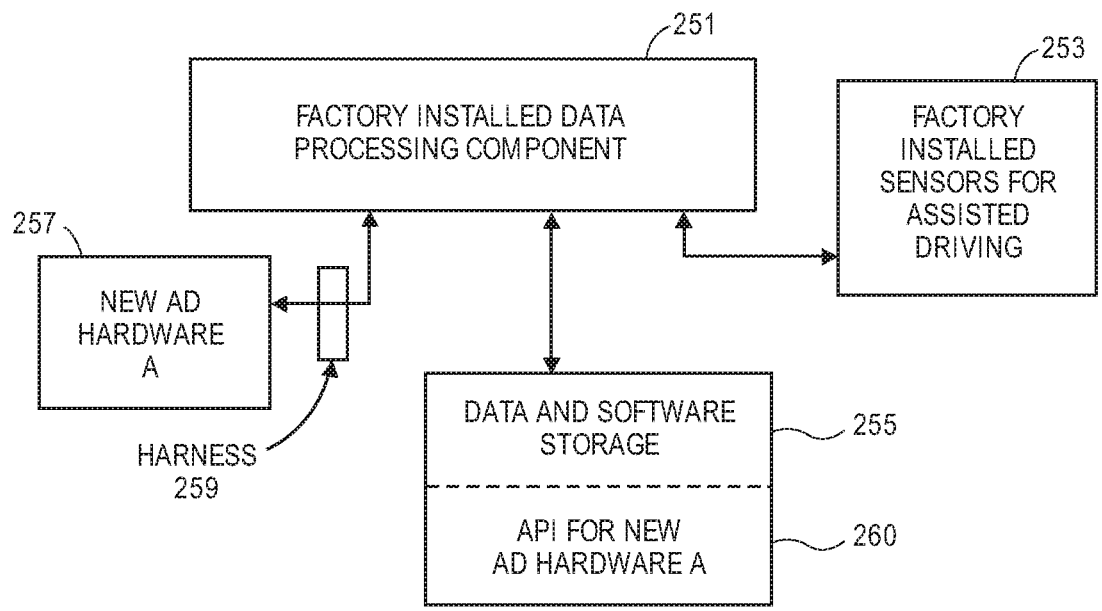
FIG. 7A (FIG. 7A) shows an example in one embodiment in which a first assisted driving hardware component causes the car to set up an API for that particular hardware component.
Figure 7B:
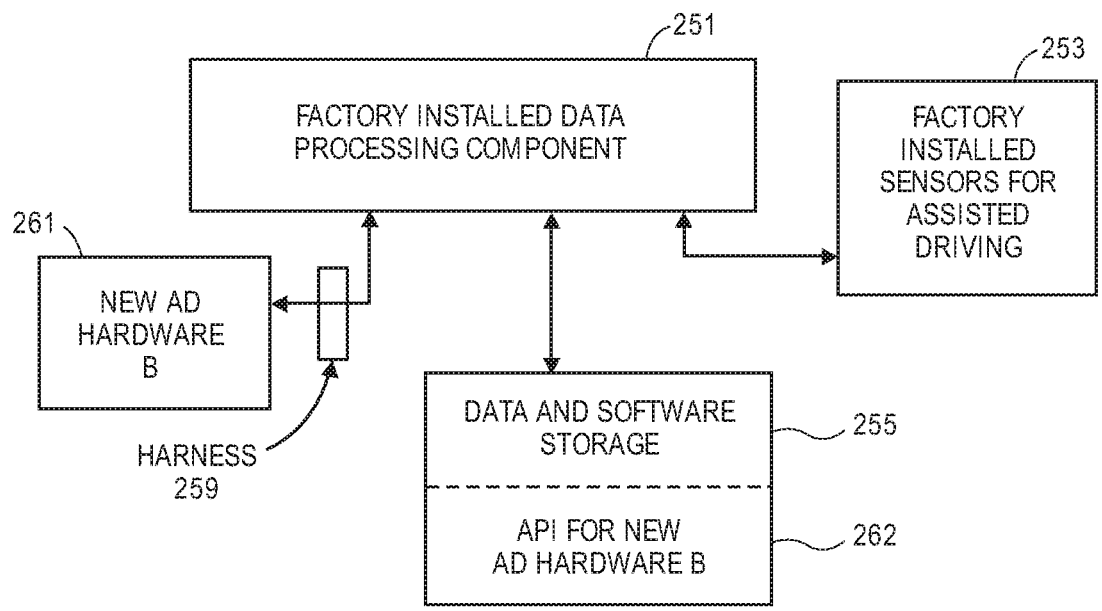
FIG. 7B (FIG. 7B) shows an example of the car setting up a API for a different assisted driving hardware component which can result in a different API then the API shown in FIG. 7A.

FIGS. 7A and 7B show examples of the same assisted driving system which can be used with two different new assisted driving hardware components. The examples shown in FIGS. 7A and 7B allow a user to plug different new assisted driving hardware into the car and the car will configure them differently. A car can include the assisted driving system shown in FIG. 7A or 7B depending on which of the two different assisted driving hardware components is installed by the user or owner of the car, and that assisted driving system can include a factory installed data processing component 251 is coupled to a factory installed sensors 253 for assisted driving. The factory installed data processing component 251 is also coupled to data and software storage 255 which can store data and software for use by the data processing component to provide assisted driving functionality to the car. When, as shown in FIG. 7A, the user or owner plugs in the new assisted driving hardware component shown as new AD hardware 257 into the harness 259, the system sets up an API 260 for the new assisted driving hardware 257, and this API 260 can be used to allow software for the new assisted driving hardware 257 to operate with the data processing component 251. When, as shown in FIG. 7B, the user or owner plugs in the new assisted driving hardware component shown as new AD hardware 261 into the harness 259, the system sets up an API 262 for the new assisted driving hardware 261, and this API 262 can be used to allow software for the new assisted driving hardware 261 to operate with the data processing component 251. In one embodiment, the application programming interface or API 262 for the new hardware 261 can be different than the API 260 for the new assisted driving hardware 257. This can allow the user or owner of the car to select from an assortment of possible new assisted driving hardware components which can be plugged into the harness 259, and the system can be used to properly establish the appropriate API for intercommunication and operational functionality between the new hardware component and the existing assisted driving system of the car which includes the data processing component 251.

Figure 8:
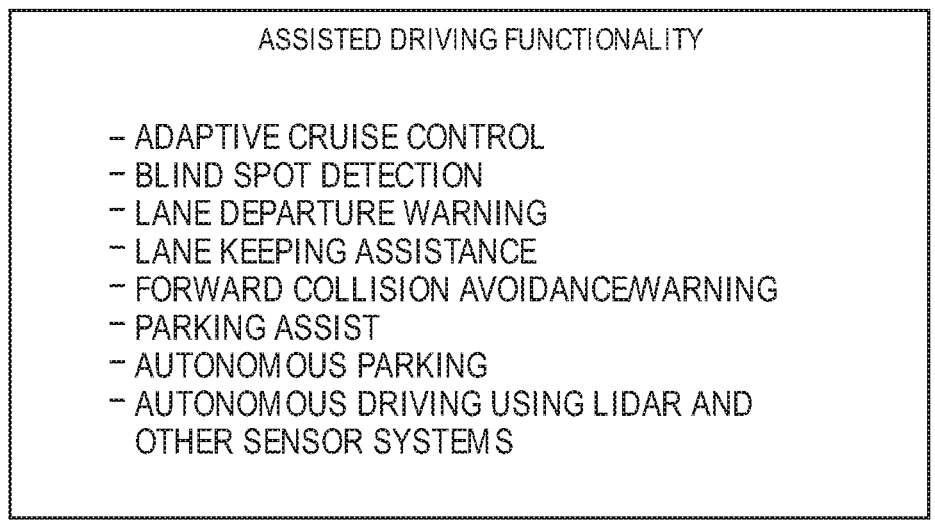
FIG. 8 (FIG. 8) shows a list of assisted driving functionalities or features.

FIG. 8 shows a list of assisted driving functionalities or features. In one embodiment, a subset of these features or functionalities can be provided as factory installed features prior to installing the new hardware such as the assisted driving hardware component 155 or the assisted driving complete hardware component 60. After the assisted driving hardware component 155 or 60 has been plugged into the factory installed harness, the full set of assisted driving functionality shown in FIG. 8 can be provided in one embodiment.

It will be apparent from this description that aspects of the present invention may be embodied, at least in part, in software. That is, the techniques may be carried out in a data processing system in response to its processor(s) executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A car comprising:
a factory installed harness;
a data processing component coupled to the factory installed harness;
a set of one of more factory installed sensors coupled to the data processing component, the set of factory installed sensors configured to provide assisted driving functionality, wherein the harness is configured to mechanically receive an assisted driving hardware component in order to make an electrical connection between the assisted driving hardware component and the data processing component;
a redundant braking system controller coupled to the data processing component and configured to be controlled based upon data from the assisted driving hardware component; and
a redundant battery system coupled to the data processing component and to the assisted driving hardware component.

2. The car as in claim 1, the car further comprising:
the assisted driving hardware component coupled mechanically to the harness and coupled electrically to the data processing component.

3. The car as in claim 2, the car further comprising:
a radio configured to receive downloaded software to setup and activate the assisted driving hardware component, the radio coupled to the data processing component.

4. The car as in claim 3, the car further comprising:
a set of one or more electric motors coupled to the data processing component;
a braking system coupled to a braking system controller which is coupled to the data processing component;
a steering system coupled to the data processing component.

5. The car as in claim 4, the car further comprising:
a storage medium to store data for an assisted driving system which is controlled at least in part by the data processing component, and to store calibration data for sensors of the assisted driving system, and to store software to initialize and operate the assisted driving system and initialize the assisted driving hardware component.

6. The car as in claim 5, the set of factory installed sensors configured to provide parking assistance to park the car.

7. The car as in claim 1, the car further comprising:
a touchscreen display and input device coupled to the data processing component and configured to display a machine human interface to control the assisted driving hardware component, the machine human interface activated after installation of the assisted driving hardware component.

8. The car as in claim 1, wherein the assisted driving hardware component adds at least level IV assisted driving functionality to the car.

9. The car as in claim 1, wherein the data processing component includes one or more processors for parking assist and one or more processors for high speed processing during driving at highway speeds.

10. The car as in claim 9, wherein the data processing component is configured to receive downloaded software for use in activating and operating the assisted driving hardware component, and the data processing component is to activate and calibrate the assisted driving hardware component using the downloaded software.

11. The car as in claim 10, wherein an application programming interface (API) for the assisted driving hardware component is activated and enabled for use by the assisted driving hardware component and the data processing component to allow the assisted driving hardware component to operate with the data processing component.

12. A method for adding assisted driving functionality to a car, the method comprising:
receiving, by the car having a factory installed harness, an assisted driving hardware component which includes an electrical connection interface configured to mechanically and electrically couple to the factory installed harness;
setting up, by a data processing component in the car, the assisted driving hardware component to operate with the data processing component to add assisted driving functionality to the car;
wherein the data processing component is factory installed;
wherein the car receives the assisted driving hardware component when a user or dealer or service facility installs the assisted driving hardware component, and
wherein the assisted driving hardware component is set up after downloading of software for use with the assisted driving hardware component.

13. The method as in claim 12, wherein the downloading occurs through a mobile application running on the user's mobile device which stores a vehicle identification number of the car and a user identification data, the vehicle identification number of the car and the user identification data used to authenticate the user to the car to allow the car to install the downloaded software and to authenticate the assisted driving hardware component to the car.

14. The method of claim 13, wherein the downloading is through one or more radios, the one or more radios including a radio frequency transceiver in the mobile device and a radio frequency transceiver in the car, wherein the radio frequency transceiver in the mobile device is one of a WiFi transceiver or a cellular telephone transceiver, and the radio frequency transceiver in the car is one of a Bluetooth transceiver, a WiFi transceiver, or a cellular telephone transceiver.

15. The method of claim 13, wherein prior to receiving the assisted driving hardware component the car has a first level of assisted driving and after receiving the assisted driving hardware component the car has a second level of assisted driving that has more functionality than the first level.

16. The method of claim 12, the method further comprising:
downloading software for use in setting up the assisted driving hardware component; authenticating the assisted driving hardware component based on data from the car and data from the assisted driving hardware component;
setting up the assisted driving hardware component by activating an application programming interface between software running in the assisted driving hardware component and software running on the data processing component;
calibrating one or more sensors in the assisted driving hardware component, the calibrating performed in part by the downloaded software;
activating a human machine interface in the car for the assisted driving hardware component.

17. The method of claim 16, wherein the data processing component is configured to receive the downloaded software for use in activating and operating the assisted driving hardware component, and the data processing component activates and calibrates the assisted driving hardware component using the downloaded software.

18. The method of claim 17, wherein an application programming interface (API) for the assisted driving hardware component is activated for use by the assisted driving hardware component and the data processing component to allow the assisted driving hardware component to operate with the data processing component.

19. The method of claim 17, wherein the data processing component is coupled to one or more motors that are configured to move the car and is coupled to one or more braking systems that are configured to slow the car and is coupled to a steering system to steer the car and wherein the data processing component provides driving assistance by controlling the one or more motors, the one or more braking systems, and the steering system based on data from the assisted driving hardware component after the one or more sensors in the assisted driving hardware component have been calibrated.

20. The method as in claim 19, wherein the car includes a redundant braking control system coupled to the data processing component and the data processing component is configured to control the redundant braking control system based on data from the assisted driving hardware component.

21. The method as in claim 20, wherein the assisted driving hardware component is a LIDAR.

* * * * *